(12) United States Patent
Huang et al.

(10) Patent No.: US 9,421,517 B2
(45) Date of Patent: Aug. 23, 2016

(54) METAL-ORGANIC FRAMEWORK POLYMER FOR SOLID-PHASE MICROEXTRACTION

(71) Applicant: Chung Yuan Christian University, Chung-Li (TW)

(72) Inventors: Hsi-Ya Huang, Zhongli (TW); Chia-Her Lin, Hsinchu (TW); Chen-Lan Lin, Tainan (TW); Yung-Han Shih, New Taipei (TW); Stephen Lirio, Daraga (PH); Ya-Ting Chen, New Taipei (TW)

(73) Assignee: CHUNG YUAN CHRISTIAN UNIVERSITY, Chung-Li (TW)

( * ) Notice: Subject to any disclaimer, the term of this patent is extended or adjusted under 35 U.S.C. 154(b) by 0 days.

(21) Appl. No.: 14/600,014

(22) Filed: Jan. 20, 2015

(65) Prior Publication Data

US 2016/0208047 A1     Jul. 21, 2016

(51) Int. Cl.
| | | |
|---|---|---|
| *B01J 20/32* | (2006.01) | |
| *C08G 73/02* | (2006.01) | |
| *B01J 20/02* | (2006.01) | |
| *B01J 20/26* | (2006.01) | |
| *B01J 20/285* | (2006.01) | |

(52) U.S. Cl.
CPC .............. *B01J 20/3204* (2013.01); *B01J 20/02* (2013.01); *B01J 20/0203* (2013.01); *B01J 20/0218* (2013.01); *B01J 20/0225* (2013.01); *B01J 20/0229* (2013.01); *B01J 20/0237* (2013.01); *B01J 20/0244* (2013.01); *B01J 20/0248* (2013.01); *B01J 20/261* (2013.01); *B01J 20/285* (2013.01); *B01J 20/3214* (2013.01); *B01J 20/3231* (2013.01); *C08G 73/024* (2013.01)

(58) Field of Classification Search
CPC ................................................... C08G 73/024
See application file for complete search history.

(56) References Cited

U.S. PATENT DOCUMENTS

2008/0227634 A1* 9/2008 Muller .................. B01D 53/02
502/402

FOREIGN PATENT DOCUMENTS

| CN | 102091604 A | 6/2011 |
|---|---|---|
| CN | 102989432 A | 3/2013 |
| CN | 103599764 A | 2/2014 |
| CN | 103611510 A | 3/2014 |
| CN | 103877942 A | 6/2014 |

OTHER PUBLICATIONS

Chen, Y.F., et al.; Langmuir, 2010, p. 8743-8750.*
Lin, C.L., Lirio, S., Chen, Y.T., Lin, C.H. and Huang, H.Y. (2014), A Novel Hybrid Metal-Organic Framework—Polymeric Monolith for Solid-Phase Microextraction. Chem. Eur. J., 20: 3317-3321. doi: 10.1002/chem.201304458, Published online on Feb. 24, 2014.
Date of Publication information for Lin, C.L., Lirio, S., Chen, Y.T., Lin, C.H. and Huang, H.Y. (2014), A Novel Hybrid Metal-Organic Framework—Polymeric Monolith for Solid-Phase Microextraction. Chem. Eur. J., 20: 3317-3321. doi: 10.1002/chem.201304458, Published online on Feb. 24, 2014.
Supporting information for Lin, C.L., Lirio, S., Chen, Y.T., Lin, C.H. and Huang, H.Y. (2014), A Novel Hybrid Metal-Organic Framework—Polymeric Monolith for Solid-Phase Microextraction. Chem. Eur. J., 20: 3317-3321. doi: 10.1002/chem.201304458.
Hiroyuki Kataoka, "Current Developments and Future Trends in Solid-phase Microextraction Techniques for Pharmaceutical and Biomedical Analyses", Analytical Sciences Sep. 10, 2011, vol. 27 893-905.

* cited by examiner

*Primary Examiner* — Robert Jones, Jr.
(74) *Attorney, Agent, or Firm* — Ding Yu Tan

(57) ABSTRACT

A metal-organic framework (MOF) polymer for solid-phase microextraction (SPME) includes an MOF including metal ions building units coordinating polytopic organic linkers; and a polymer coordinatively bonding to the MOF, wherein the polymer is composed of one or more vinyl monomers and a cross-linker those are polymerized in the presence of a radical initiator. A method for preparing a stationary phase for SPME is also provided.

12 Claims, 10 Drawing Sheets

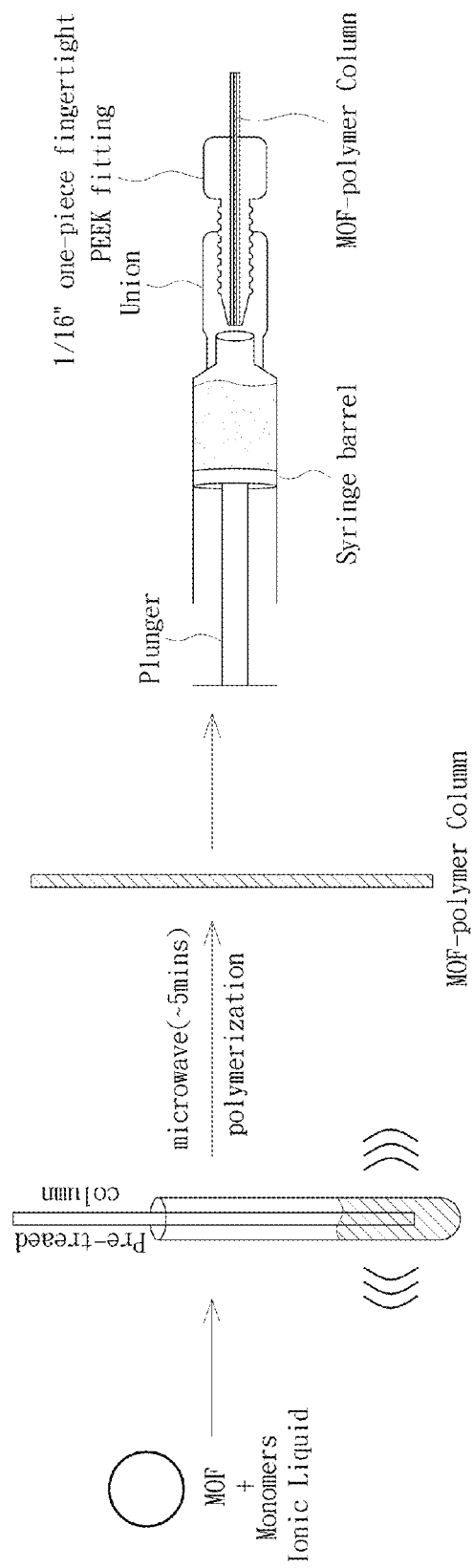

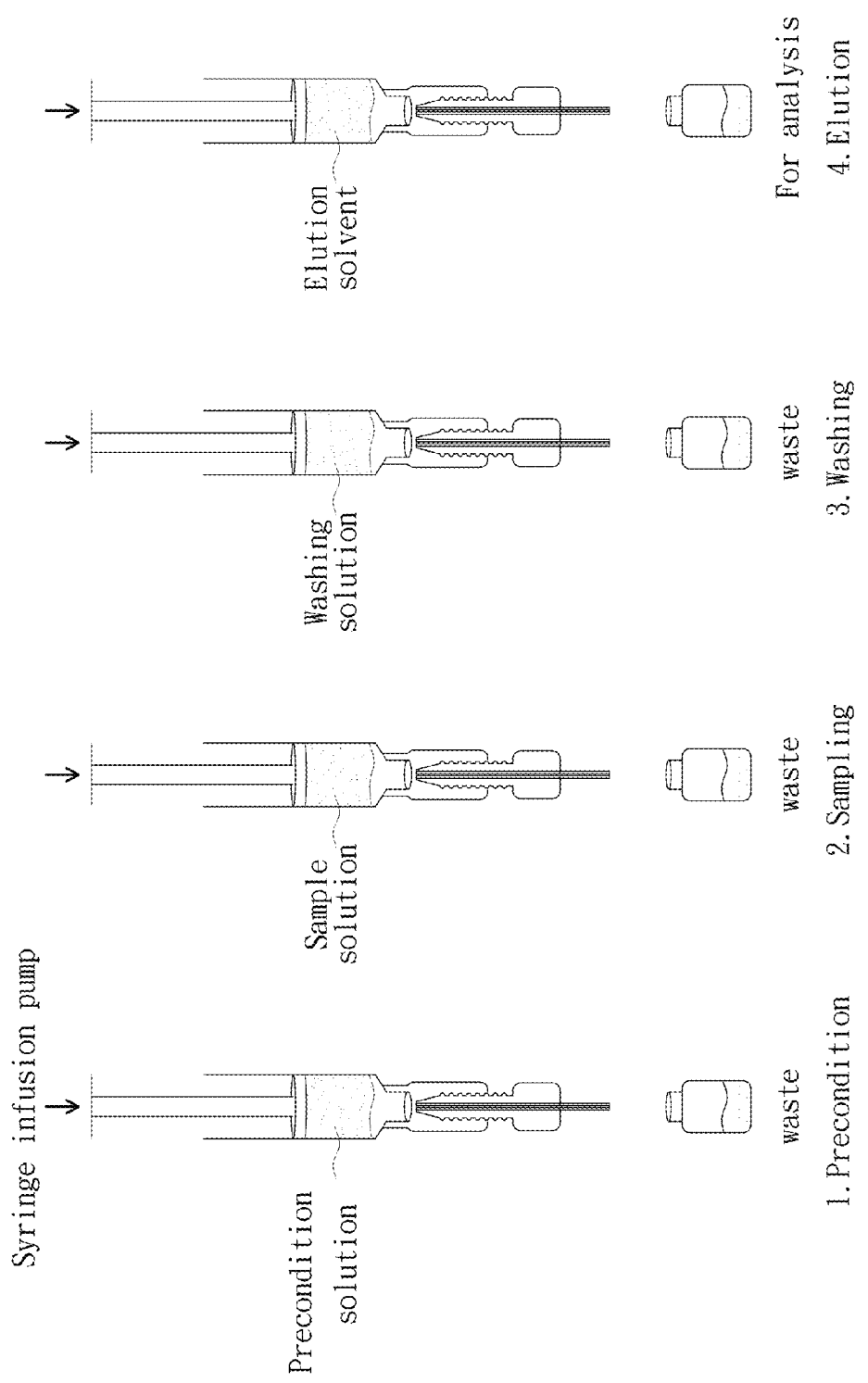

METAL-ORGANIC FRAMEWORK POLYMER FOR SOLID-PHASE MICROEXTRACTION

FIELD OF THE INVENTION

The present invention relates to a metal-organic framework (MOF) polymer for solid-phase microextraction (SPME), and more particularly to a MOF-polymeric monolith for use as a stationary phase in SPME.

BACKGROUND OF THE INVENTION

Metal-organic frameworks (MOFs) are nanoporous materials that contain high surface areas (>7000 $m^2g^{-1}$) with metal-ion coordination centers linked together with organic bridging ligands. The interest in MOF materials is popular owing to their wide range of applications, including gas storage and separation, drug delivery, gas sensors, catalysis, chromatography, etc. Recently, MOF-derived nanoporous carbon materials have also demonstrated unique porous structures: the MOFs were used as sacrificial templates to create the nanoporous carbon materials and these were reported to have good thermal and chemical stability.

Although MOFs have transpired to be one of the more promising research areas, few studies have been conducted on the application of MOFs to solid-phase microextraction (SPME). In 1990, Arthur and Pawliszyn first proposed the concept of SPME that is nowadays widely used in the analysis for pharmaceutical, food, aromatic, forensic, metallic, biological, and environmental samples. Studies have also been conducted on the fabrication of SPME using MOFs; however, the majority of these conducted studies were physically coated (in-tube SPME) but had limited stability, durability, and reproducibility.

SUMMARY OF THE INVENTION

The present invention provides a metal-organic framework (MOF) polymer for solid-phase microextraction (SPME), including: an MOF including metal ions building units coordinating polytopic organic linkers; and a polymer coordinatively bonding to the MOF, the polymer being composed of one or more vinyl monomers and a cross-linker, wherein the one or more vinyl monomers and the cross-linker are polymerized in the presence of a radical initiator.

According to an embodiment of the invention, the metal ions include copper(II), zinc(II), chromium(III), ion(III), aluminium(III), zirconium(III), gallium(III) and cobalt (III).

According to an embodiment of the invention, the metal ions building units include MIL-101 (Cr), MIL-100(Cr), MIL-100(Fe), MIL-100(Al), UiO-66(Zr), and MIL-88B(Cr).

According to an embodiment of the invention, the polytopic organic linkers include 1,4-benzenedicarboxylic acid ($H_2$-bdc), 1,3,5-benzenetricarboxylic acid (1,3,5-btc), 2-amino terephthalic acid ($NH_2$-bdc), 4,4'-biphenyldicarboxylate (bpdc), 2,6-naphthalenedicarboxylate (ndc), 4,4'-stilbenedicarboxylic acid ($H_2$—SDC) and 2-methylimidazole (2-MIM), and any combinations thereof.

According to an embodiment of the invention, the polyvinyl monomers include divinylbenzene, divinylnaphthalene, divinylpyridine, alkylene dimethacrylates, hydroxyalkylene dimethacrylates, hydroxyalkylene diacrylates, oligo ethylene glycol dimethacrylates, oligo ethylene glycol diacrylates, vinyl esters of polycarboxylic acids, divinyl ether, pentaerythritol di-, tri-, or tetramethacrylate or acrylate, trimethylopropane trimethacrylate or acrylate, alkylene bisacrylamides or meth-acrylamides, and any combinations thereof.

Also, the present invention provides a stationary phase for SPME, including the above-mentioned MOF-polymer for SPME.

Further, the present invention provides a method for preparing a stationary phase for SPME, including the steps of: capillary vinylization to an inner wall of a capillary tube; and preparing an MOF-polymer by loading and mixing an organic monomer, a cross-linker, an initiator and a progenic solvent in the capillary tube, and then performing an polymerization reaction via microwave-assisted heating the capillary tube.

According to an embodiment of the invention, the method for preparing a stationary phase for SPME further includes washing the capillary tube by methanol.

According to an embodiment of the invention, the step of capillary vinylization is by filling the capillary tube by 3-trimethoxysilylpropyl methacrylate (MSMA) and MeOH (50%, v/v).

According to an embodiment of the invention, the organic monomer is selected from the group consisting of butyl methacrylate (BMA), divinylbenzene (DVB), styrene (St) and ethylene dimethacrylate (EDMA).

According to an embodiment of the invention, the progenic solvent is an ionic liquid selected from the group consisting of 1-hexyl-3-methylimidazolium tetrafluoroborate ([$C_6$min][$BF_4$]), 1-ethyl-3-methylimidazolium bis(trifluoromethylsulfonyl)imide ([Emim][TF]), 1-butyl-3-methylimidazolium bis(trifluoromethylsulfonyl)imide ([Bmim][TF]), 1-butyl-3-methylimidazolium tetrafluoroborate ([Bmim][BE]), 1-butyl-3-methylimidazolium hexafluorophosphate ([Bmim][$PF_6$]) and 1-hexyl-3-methylimidazolium hexafluorophosphate ([Hmim][$PF_6$]) and any combinations thereof.

According to an embodiment of the invention, the microwave-assisted heating is applied at a power level of about 800-1000 W for 5 minutes.

BRIEF DESCRIPTION OF THE DRAWINGS

The present invention will become more readily apparent to those ordinarily skilled in the art after reviewing the following detailed description and accompanying drawings, in which:

FIGS. 1A-1D are schematic diagrams showing synthesis and fabrication of MOF-polymer for use as a stationary phase for SPME applications;

FIGS. 4A-4D are schematic diagrams showing operational conditions and extraction procedure of SPME;

DETAILED DESCRIPTION OF PREFERRED EMBODIMENTS

Figures 2A, 2B:
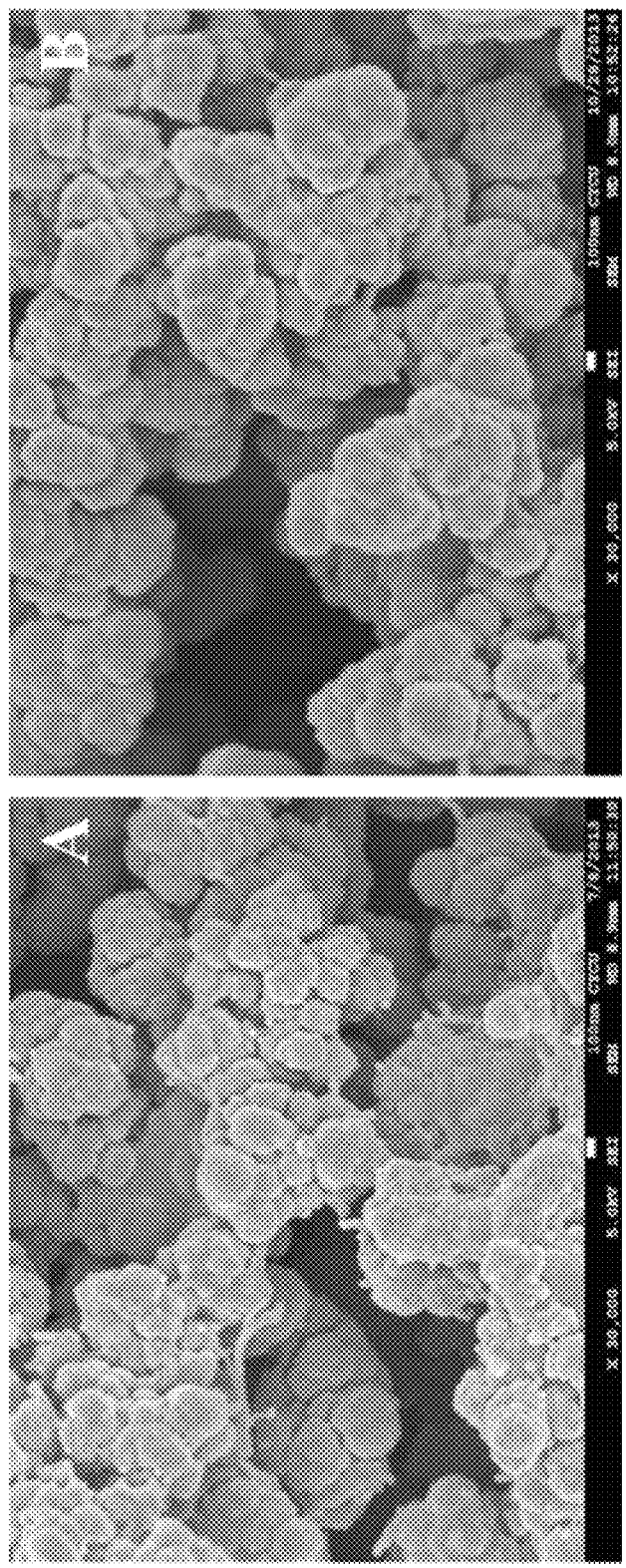
FIGS. 2A and 2B are black and white photographs showing two scanning electron micrographs (SEMs) of the MIL-101 (Cr)-polymer: A) before extraction and B) after extraction ($45^{th}$ cycle) at 30000× magnification.
Figure 3A:
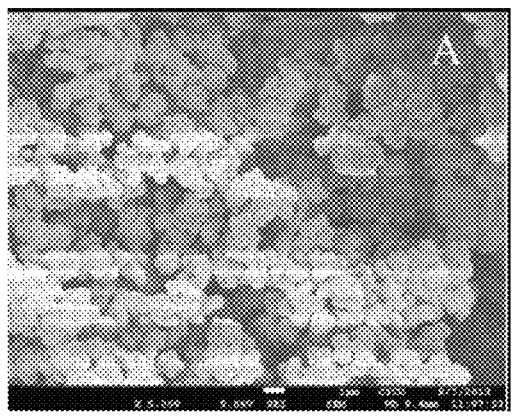
FIGS. 3A-3E are black and white photographs showing SEMs of MOF-polymers at 5000× magnification: A) MIL-100(Cr), B) MIL-100(Fe), C) MIL-100(Al), D) UiO-66(Zr) and E) MIL-88B(Cr)
Figure 3D:
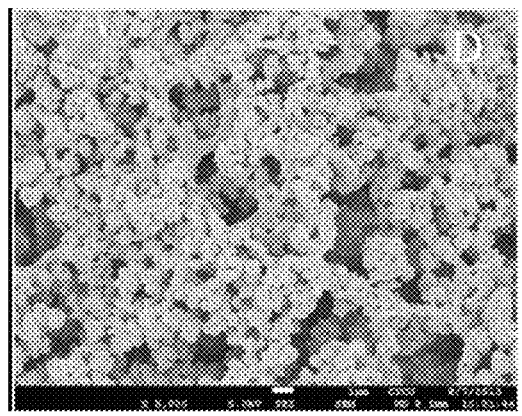
Figure 3B:
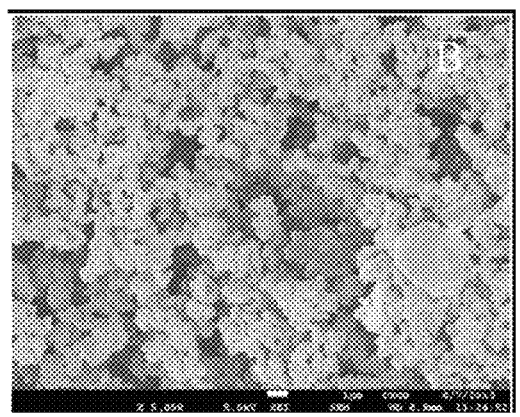
Figure 3E:
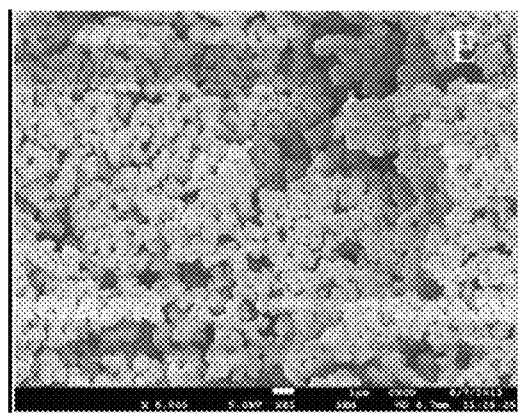
Figure 3C:
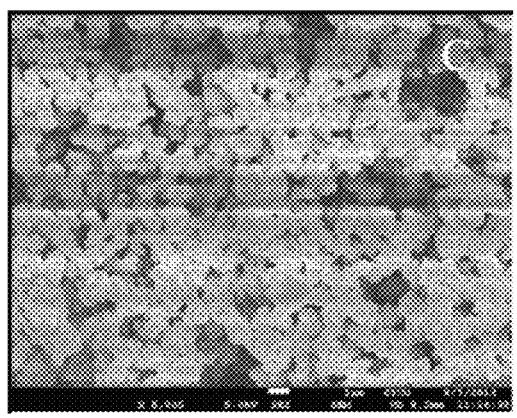

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The invention provides a MIL-101(Cr) monolith as a stationary phase for solid-phase microextraction (SPME). MIL-101(Cr) is a nano-/mesoporous chromium terephthalate cage-type MOF with high surface area (~4100 $m^2g^{-1}$) and porosity. Recently, organic polymers have been synthesized by in situ preparation, and are evaluated as alternative stationary phases to replace traditional C18 packing materials. In addition to being a good stationary phase, small and large through-pores of the MIL-101(Cr) monolith are used for better separation.

Hereinafter, a MOF-polymer as an alternative organic-inorganic stationary phase for SPME will be described. By using the MOF-polymer, unique micro- and mesopore sizes were developed and thereby increased the accessibility of the mobile phase and analytes along with increasing the efficiency of the adsorption and desorption processes of the analytes. Moreover, investigations into factors affecting the performance of the fabricated SPME column at different conditions were also conducted.

The fabricated SPME was further evaluated by analyzing the detection of penicillin G (PENG), penicillin V (PENV), oxacillin (OXA), cloxacillin (CLOX), nafcillin (NAFC), and dicloxacillin (DICL) as test samples, followed by quantitative analysis of the recovered analytes by using capillary electro-chromatography (CEC). Finally, the extraction efficiencies (i.e., extraction time and limit of detection (LOD)) of the analytes were compared with literature values.

In any method used for extraction, the time needed for adsorption and desorption plays a very important role in quantitative analysis. As a result, the extraction procedure should be equal to or longer than the shortest time required to reach the sorption equilibrium. Prior to the synthesis of MIL101(Cr)-polymer, the capillary column was underwent vinylization.

Synthesis of Metal-Organic Framework (MOF)

1. Synthesis of MIL-101(Cr)

MIL-101(Cr), $[Cr_3O(BDC)_3(F)(H_2O)_2].25H_2O$, was synthesized and activated according to the procedures as follows. Generally, MIL-101(Cr) was hydrothermally synthesized by a mixture of chromium nitrate nonahydrate ($Cr(NO_3)_3.9H_2O$: 400 mg, 1.0 mmol), terephthalic acid ($C_8H_6O_4$, 166 mg, 1.0 mmol), HF (0.2 ml) and $H_2O$ (5 ml) which were placed in a 23 mL Teflon autoclave. The mixture was heated at 220° C. for 8 hours. The resulting green powdered sample was collected by filtration, washed with purified water and ethanol (EtOH) and dried at room temperature. An activation condition was applied by further heating for 1 day in dimethylformamide (DMF) then stirring in EtOH for overnight. The MIL-101(Cr) was vacuumed and heated at 150° C. for 1 day before further experiments are performed.

2. Synthesis of MIL-100(Cr)

The chromium trimesate MIL-100(Cr), $[Cr_3F(H_2O)_2O(BTC)_2].28.5H_2O$, was synthesized and activated according to the procedures as follows. Generally, MIL-100(Cr) was hydrothermally synthesized by a mixture of chromium nitrate nonahydrate ($Cr(NO_3)_3.9H_2O$: 400 mg, 1.0 mmol), trimesic acid ($C_9H_6O_6$, 141 mg, 0.67 mmol), HF (0.07 ml) and $H_2O$ (5 ml) which were placed in a 23 mL Teflon autoclave. The mixture was heated at 220° C. for 4 days. The resulting dark-green powdered sample was collected by filtration, washed with purified water and dried at room temperature. An activation condition was applied by further reflux for 4 hours with DMF and 1 day in EtOH. The MIL100(Cr) was vacuumed and heated at 150° C. for 1 day before further experiments are performed.

3. Synthesis of MIL-100(Fe)

MIL-100(Fe), $[Fe_3F(H_2O)_2O(BTC)_2].14.5H_2O$, was synthesized and activated according to the procedures as follows. Generally, MIL-100(Fe) was hydrothermally synthesized under microwave-assisted reactions. A mixture of iron nitrate nonahydrate ($Fe(NO_3)_3.9H_2O$, 404 mg, 1.0 mmol), trimesic acid ($C_9H_6O_6$, 141 mg, 0.67 mmol), $HNO_3$ (0.025 ml), HF (0.035 ml) and $H_2O$ (5 ml) were placed in a 100 mL Teflon autoclave which was placed in a microwave oven. The mixture was heated at 180° C. for 30 minutes. The resulting light orange powdered sample was collected by filtration, washed with purified water and dried at room temperature. An activation condition was applied by further heating for 8 hours with water and EtOH. The MIL-100(Fe) was vacuumed and heated at 150° C. for 1 day before further experiments are performed.

4. Synthesis of MIL-100(Al)

The aluminum MOF MIL-100(Al), $[Al_3(OH)(H_2O)_2O(BTC)_2].24H_2O$, was synthesized and activated according to the procedures as follows. Generally, MIL-100(Al) was hydrothermally synthesized under microwave-assisted reactions. A mixture of aluminum nitrate nonahydrate ($Al(NO_3)_3.9H_2O$: 664 mg, 1.77 mmol), trimethyl-1,3,5-trimesate (($CH_3O)_3C_6H_3$, 380 mg, 1.19 mmol), $HNO_3$ (0.3 ml) and $H_2O$ (6 ml) were placed in a 100 mL Teflon autoclave which was placed in a microwave oven. The mixture was heated at 200° C. for 30 minutes. The resulting yellowish powdered sample was collected by filtration, washed with purified water and dried at room temperature. An activation condition was applied by further performing microwave-assisted heating for 4 hours with DMF and reflux for 1 day in water. The MIL-100(Al) was vacuumed and heated at 150° C. for 1 day before further experiments are performed.

5. Synthesis of UiO-66(Zr)

The UiO-66(Zr) was synthesized and activated according to the procedures as follows. Synthesis of UiO-66(Zr) was performed by dissolving $ZrCl_4$ (0.053 g, 0.227 mmol) and 1,4-benzenedicarboxylic acid ($H_2BDC$) (0.034 g, 0.227 mmol) in N,N'-dimethylformamide (DMF) (24.9 g, 340 mmol) at room temperature. The obtained mixture was sealed and placed in a pre-heated oven at 120° C. for 24 hours. After cooling in air to room temperature, the resulting solid was filtered, repeatedly washed with DMF and dried at room temperature.

6. Synthesis of MIL-88B(Cr)

MIL-88B(Cr), $[Cr_3OX(BDC)_3].xH_2O.yDMF$ (X=F, OH), was synthesized and activated according to the procedures as follows. Generally, MIL-88B(Cr) made by solvothermal synthesis is performed as follows: a mixture of chromium chloride (CrCl$_3$·6H$_2$O: 70 mg, 0.4 mmol), terephthalic acid (C$_6$H$_4$-1,4-(CO$_2$H)$_2$, 66 mg, 0.4 mmol), hydrofluoric acid (HF, 1 mmol) and dimethylformamide (DMF, 5.0 ml) were placed in a Teflon autoclave and heated in a conventional oven at 210° C. for 24 hours. The resulting powder sample was collected by filtration, washed with purified DMF and dried at room temperature. Prior to the SPME application, the MIL-88B(Cr) samples were calcined overnight in air at 150° C. to evacuate the solvent.

Preparation of Hybrid MOF-Polymer Monolith Column

According to an embodiment of the invention, the method for preparing a stationary phase for SPME includes the steps of: providing capillary vinylization to an inner wall of a capillary tube; and preparing an MOF-polymer by loading and mixing an organic monomer, a cross-linker, an initiator and a progenic solvent in the capillary tube, and then performing an polymerization reaction via microwave-assisted heating the capillary tube.

In detail, the organic monomer can be selected from the group consisting of butyl methacrylate (BMA), divinylbenzene (DVB), styrene (St) and ethylene dimethacrylate (EDMA). The progenic solvent is an ionic liquid, which can be selected from the group consisting of 1-hexyl-3-methylimidazolium tetrafluoroborate ([C$_6$ min][BF$_4$]), 1-ethyl-3-methylimidazolium bis(trifluoromethylsulfonyl)imide ([Emim][TF]), 1-butyl-3-methylimidazolium bis(trifluoromethylsulfonyl)imide ([Bmim][TF]), 1-butyl-3-methylimidazolium tetrafluoroborate ([Bmim][BE]), 1-butyl-3-methylimidazolium hexafluorophosphate ([Bmim][PF$_6$]) and 1-hexyl-3-methylimidazolium hexafluorophosphate ([Hmim][PF$_6$]) and any combinations thereof. The microwave-assisted heating is applied at a power level of about 800-1000 W for 5 minutes.

FIGS. 1A-1D are schematic diagrams showing synthesis and fabrication of MOF-polymer for use as a stationary phase for SPME applications To prepare the hybrid MOF-polymer monolith column, butyl methacrylate (BMA), ethylene dimethacrylate (EDMA), AIBN (azobisisobutyronitrile, as a radical initiator), and MOF were mixed in an Eppendorf tube and loaded into the pretreated capillary column. The MOF-polymer monolith was formed through a microwave-assisted reaction as shown in FIG. 1B. Prior to the preparation of a polymeric monolithic column, the inner wall of a 0.8-1.1×100 mm capillary tube was treated. Capillary columns were filled with vinylization solution composed of MSMA mixed with MeOH (50%, v/v), then sealed with silicon and incubated for 17 hours at 35° C. For the preparation of MOF-poly(BMA-EDMA) monolithic column, 2 mg of MOF (25 wt. % of monomer amount) was suspended in the mixture containing monomers (BMA (3.6 µL) and EDMA (5.4 µL)), and porogenic solvents ([C$_6$min][BF$_4$] (38 µL) and water (3 µL)), AIBN (0.5 mg). The mixture was vortexed, sonicated, and degassed until homogenous, and then the pretreated column was filled with the mixture. The column containing the mixture was then sealed and submerged in water (500 mL), which was followed by in situ polymerization through microwave-assisted heating for 5 minutes (microwave oven: 900 W). With the aid of microwave-assisted polymerization, a MOF-polymer monolithic material was developed that is strongly-bonded to the capillary tube. A liquid chromatography (LC) pump was used to flush away the unreacted starting materials in the columns with methanol. Preliminary analysis of the fabricated SPME column shows that it has low backpressure, which indicates good permeability between the mobile and stationary phases. About 3 cm of the fabricated SPME was used for the extraction of the penicillin analytes.

Pretreatment of the capillary tube was performed using NaOH (0.1 M, 0.5 mL for 10 minutes), H$_2$O (2 mL for 20 minutes), and MeOH (2 mL for 5 minutes) and was followed by drying in an oven for 20 minutes at 80° C. The tube was filled with a mixture of 3-trimethoxysilylpropyl methacrylate (MSMA)/MeOH (1:1) then sealed with silicon and incubated for 17 hours at 35° C. Afterwards, the column was washed with MeOH (2 mL for 13 minutes), H$_2$O (2 mL for 13 minutes) and dried with a stream of nitrogen gas.

FIGS. 2A and 2B are black and white photographs showing two scanning electron micrographs (SEMs) of the MIL-101 (Cr)-polymer A) before extraction and B) after extraction (45$^{th}$ cycle) at 30000× magnification; and FIGS. 3A-3E are black and white photographs showing SEMs of MOF-polymers at 5000× magnification: A) MIL-100(Cr), B) MIL-100 (Fe), C) MIL-100(Al), D) UiO-66(Zr) and E) MIL-88B(Cr). As shown in FIGS. 2A, 2B and 3A-3E, the successful production of the MOF-polymers were characterized. A homogenous dispersion of MOF was present in the MOF-polymer column, a fact that can be attributed to the attraction between the unsaturated chromium ion of the MOF and the oxygen atoms of the carbonyl groups of EDMA or BMA through coordinative bonding.

Fabrication, Operational Conditions, and Extraction Procedure of MOF-Polymer for SPME FIGS. 4A-4D are schematic diagrams showing operational conditions and extraction procedure of SPME. As shown in FIG. 4A, prior to extraction of penicillin analytes, the SPME device was preconditioned by using MeOH (0.2 mL) and phosphate buffered saline (PBS; 0.5 mL) at different pH values (2-8) with a flow rate of 0.1 mLmin$^{-1}$. Penicillin solution (2 mL, 0.25-10 µgmL$^{-1}$) with PBS buffer (pH 2-8) was used in loading the sample, washed with PBS buffer (pH 2) at 0.1 mL min$^{-1}$ and eluted with MeOH (0.2 mL, 0.1 mLmin$^{-1}$).

Figures 5A, 5B:
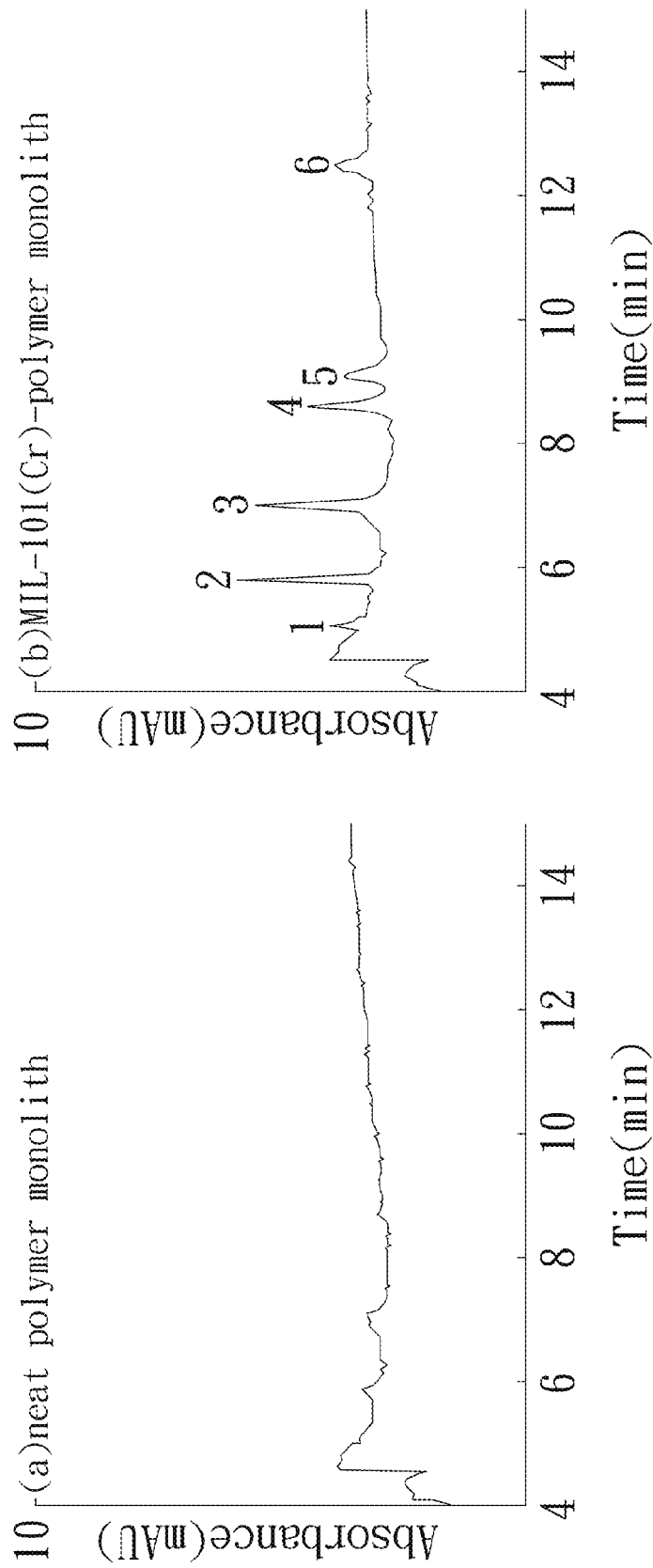
FIGS. 5A and 5B are schematic diagrams showing electrochromatogram of 6 penicillins elutes that were extracted by (a) poly(BMA-EDMA) and (b) MIL-101(Cr)-poly(BMA-EDMA)

To assess the efficiency of the fabricated MOF-polymer column, a comparison between the fabricated and neat polymer column was conducted by using six different penicillin analogues as test analytes for extraction. FIGS. 5A and 5B are schematic diagrams showing electrochromatogram of 6 penicillins elutes that were extracted by (a) poly(BMA-EDMA) and (b) MIL-101(Cr)-poly(BMA-EDMA), wherein extraction conditions are as follows: column: (a) without MOF, (b) 2 mg (25 wt. % of monomer amount) MOF, column length: 3 cm; precondition: MeOH (0.2 mL, 0.1 mL/min); pH 2 phosphate buffer (PBS) (0.5 mL, 0.1 mL/min); sampling: 1 µg/mL penicillins at pH 2 PBS buffer (2 mL, 0.1 mL/min); washing: pH 2 PBS buffer (0.5 mL, 0.1 mL/min), elution: MeOH (0.5 mL, 0.1 mL/min). As shown in FIG. 5A, none of the penicillin analytes were observed in the electrochromatogram, after eluting with methanol and using poly(BMA-EDMA) as the stationary phase. This observation indicates a low interaction between the analytes and the polymer. As a result, the retention time of the penicillin analogues on the neat polymer was inadequate. On the other hand, when using MIL-101(Cr)-polymer as the stationary phase, all the analytes were observed (FIG. 5B) after elution with MeOH. This behavior can be explained through a strong interaction between the stationary phase (i.e., unsaturated chromium from MIL-101 (Cr)) and oxygen atoms from the penicillin structures. As chromium is deemed as highly positive (electrophile), and oxygen atoms can act as the nucleophile, adsorption is thus possible. As a result, the chromium atoms make good sites for bonding with the oxygen atoms through adsorption. The effect of the mobile phase also plays an important role in the adsorption and desorption process of the analyte with the MOF-polymer. The various penicillin analogues of the test sample contain abundant polar functional groups (—NH and —COOH): thus, the extraction of penicillin analytes was determined based on the effect of the sample matrix during the adsorption and desorption process at different pH values (2-8).

Figure 6:
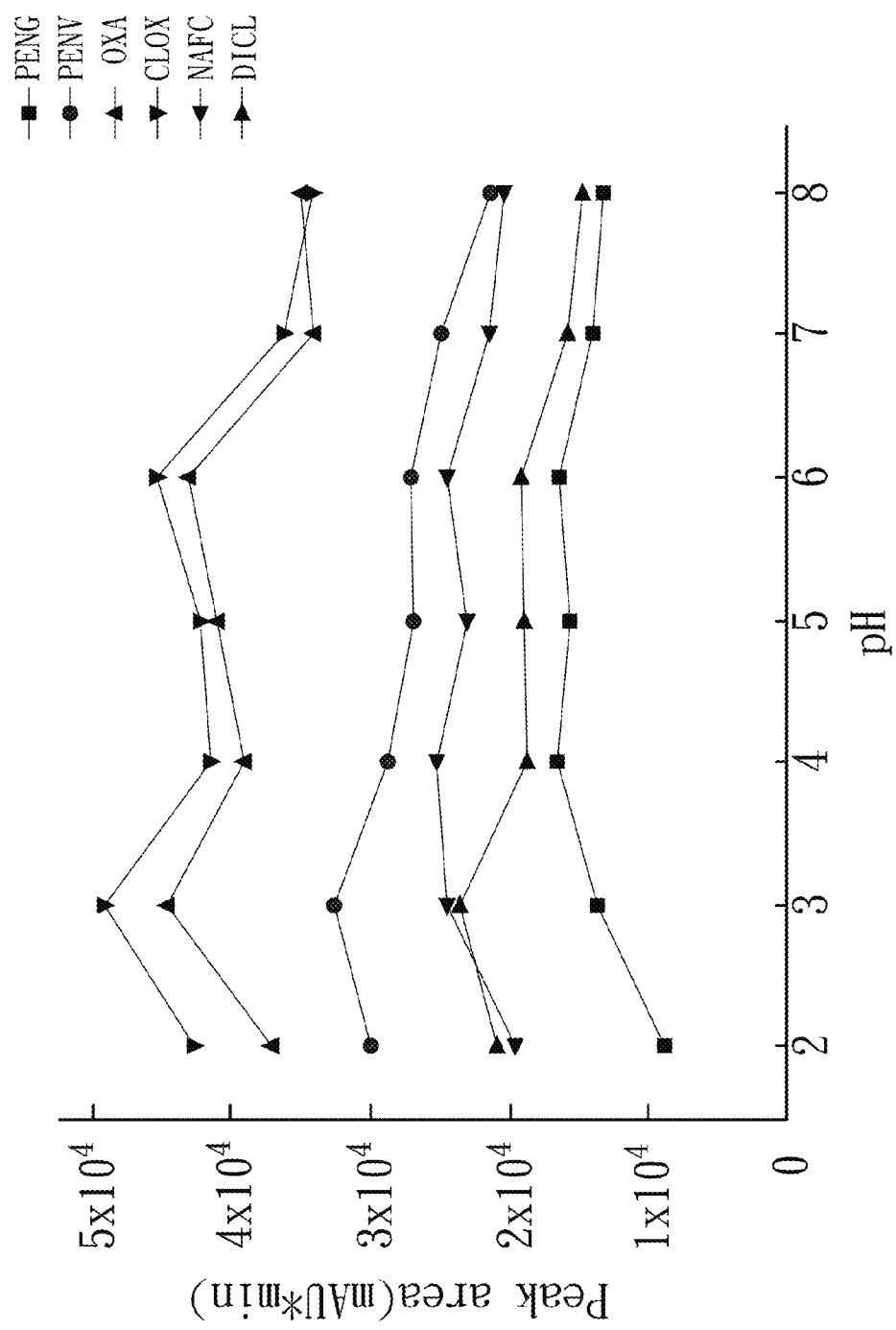
FIG. 6 is a diagram showing relations between peak area and pH values using MIL-101(Cr)-poly(BMA-EDMA) column (3 cm) at different mobile phase pH values.

In addition, to ensure a good stability of the penicillin analogues, proper storage at low temperature of the eluted analytes was necessary to prevent them from degradation prior to quantitative analysis. FIG. 6 is a diagram showing relations between peak area and pH values using MIL-101 (Cr)-poly(DMA-EDMA) column (3 cm) at different mobile phase pH values; wherein the conditions are as follows: precondition: MeOH (0.2 mL, 0.1 mL/min), pH 2-8 PBS buffer (0.5 mL, 0.1 mL/min); sampling: 1 µg/mL penicillins; elution: MeOH (0.2 mL, 0.1 mL/min), n=3. As shown in FIG. 6, the recovery percentage increased as the pH increased from 2 to 3 but leveled off in the range pH 4 to 5, and decreased as the pH was increased from 6 to 8. This effect is due to the deprotonation of penicillin structures (—COOH group) that eventually converted them to anions (pKa around 2.10-2.73), causing an electrostatic repulsion with the stationary phase that resulted in a decrease in the adsorption of the analytes.

Figure 7A:
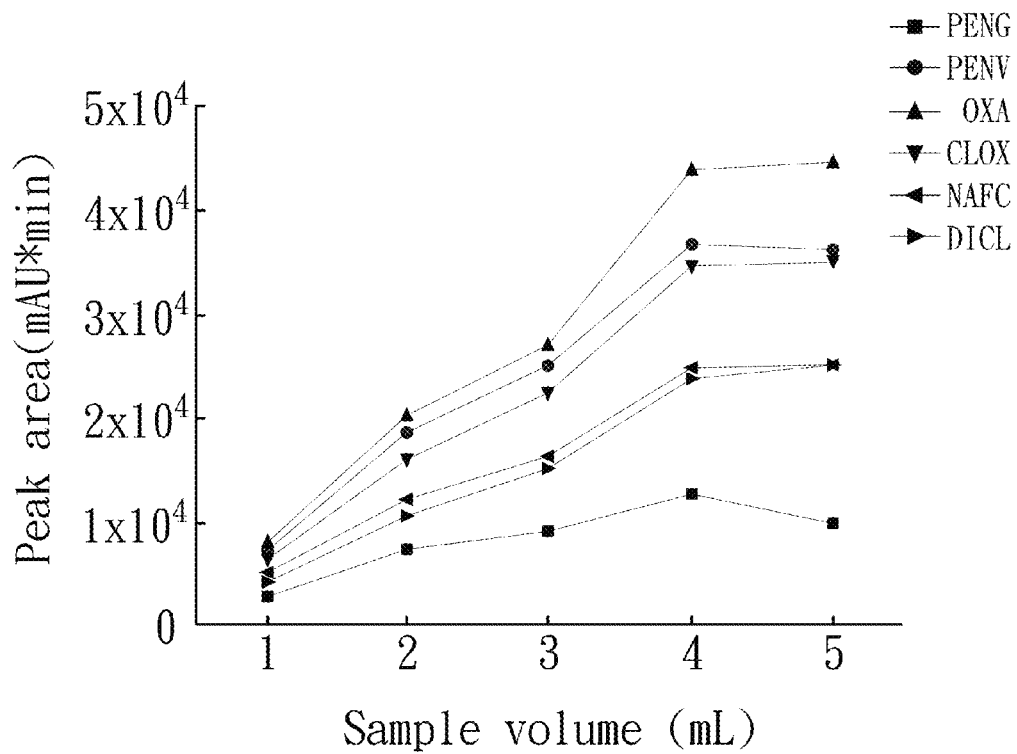
FIGS. 7A and 7B are diagrams showing (a) relations between peak area and different sample volume 1-5 mL; (b) extraction of 6 penicillins in MIL-101(Cr)-poly(BMA-EDMA) column (3 cm) at different concentrations.
Figure 7B:
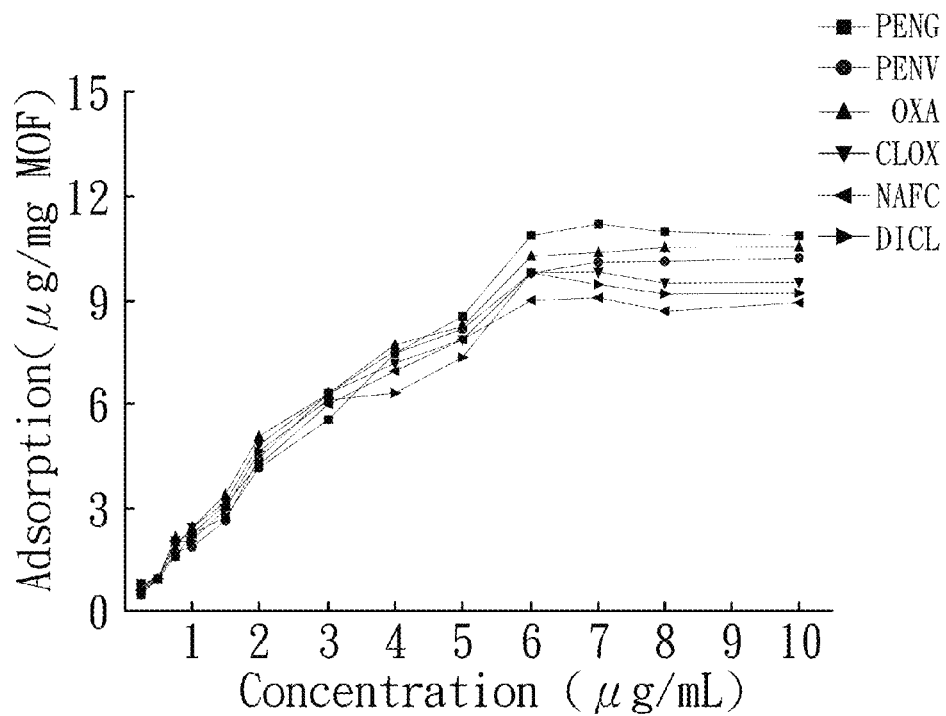

In addition, FIGS. 7A and 7B are diagrams showing (a) relations between peak area and different sample volumes 1-5 mL; (b) extraction of 6 penicillins in MIL-101(Cr)-poly (BMA-EDMA) column (3 cm) at different concentrations; wherein the conditions are as follows: precondition: MeOH (0.2 mL, 0.1 mL/min), pH 3 PBS buffer (0.5 mL, 0.1 mL/min); sampling: (a) 1 µg/mL (1-5 mL, 0.1 mL/min) (b) 0.25-10 µg/mL (2 mL, 0.1 mL/min) penicillins at pH 3 PBS buffer; elution: MeOH (0.2 mL, 0.1 mL/min); n=3. As shown in FIGS. 7A and 7B, increasing the sample concentration also led to an increase in adsorption of all the penicillin samples until an upper limit of 7 $\mu gmL^{-1}$ was reached. At this point, the maximum electron-transfer process between the chromium metal to the adsorped oxygen-containing penicillin structures has been reached. The good adsorption is possibly due to the regular and large channels of the structure as well as the ordered and suitable crystal direction in the SPME thin films. To determine the sensitivity of the fabricated SPME, a calibration curve was established to calculate the limit of detection (LOD) and limit of quantification (LOQ) for the six analyte samples. Linear dynamic ranges from 0.01-1 $\mu gmL^{-1}$ were established for all the analytes. All of analytes possessed a good linearity range ($R^2$>0.998; as shown in Table 1). The LODs and LOQs are in the range 1.2-4.5 $ngmL^{-1}$ and 4-14.8 $ngmL^{-1}$, respectively. The LODs and LOQs results suggest that the fabricated SPME column can be used to monitor trace-level penicillin samples.

TABLE 1

Linear characteristics, LOD, LOQ, intra-day, inter-day, and column-to-column recovery percentages for the fabricated MIL-101(Cr)-polymer as stationary phase for SPME

| Parameters | PENG | PENV | OXA | CLOX | NAFC | DICL |
|---|---|---|---|---|---|---|
| Concentration range [µg mL$^{-1}$] | 0.01-1.0 | 0.01-1.0 | 0.01-1.0 | 0.01-1.0 | 0.01-1.0 | 0.01-1.0 |
| Correlation coefficient [$R^2$] | 0.9984 | 0.9993 | 0.9987 | 0.9986 | 0.9988 | 0.9982 |
| LOD [ngmL$^{-1}$] | 4.3 | 1.2 | 1.4 | 2.1 | 3.0 | 4.5 |
| LOQ [ngmL$^{-1}$] | 14.4 | 4.0 | 4.6 | 7.2 | 10.1 | 14.8 |
| Intra-day (RSD %) | 63.0% (4.8%) | 89.9% (3.6%) | 96.2% (4.5%) | 89.0% (3.3%) | 82.9% (3.8%) | 92.9% (4.2%) |
| Inter-day (RSD %) | 67.5% (5.2%) | 90.6% (1.7%) | 95.7% (5.5%) | 89.2% (1.5%) | 81.3% (3.8%) | 89.4% (4.8%) |
| Column-to-column | 62.8% (5.5%) | 89.6% (4.3%) | 93.5% (4.5%) | 90.5% (4.6%) | 81.5% (4.3%) | 87.9% (6.2%) |

As shown in Table 1 above, good efficiency was achieved for all the analytes for intra-day and inter-day extraction of the various penicillin analogues with relative standard deviation (RSD) values being of not more than 5.5% in all cases. The RSD value for column-to-column precision was found to be less than 6.2%. Thus, the fabricated MOF-polymer for SPME can be used as an alternative method for extraction.

Figure 8:
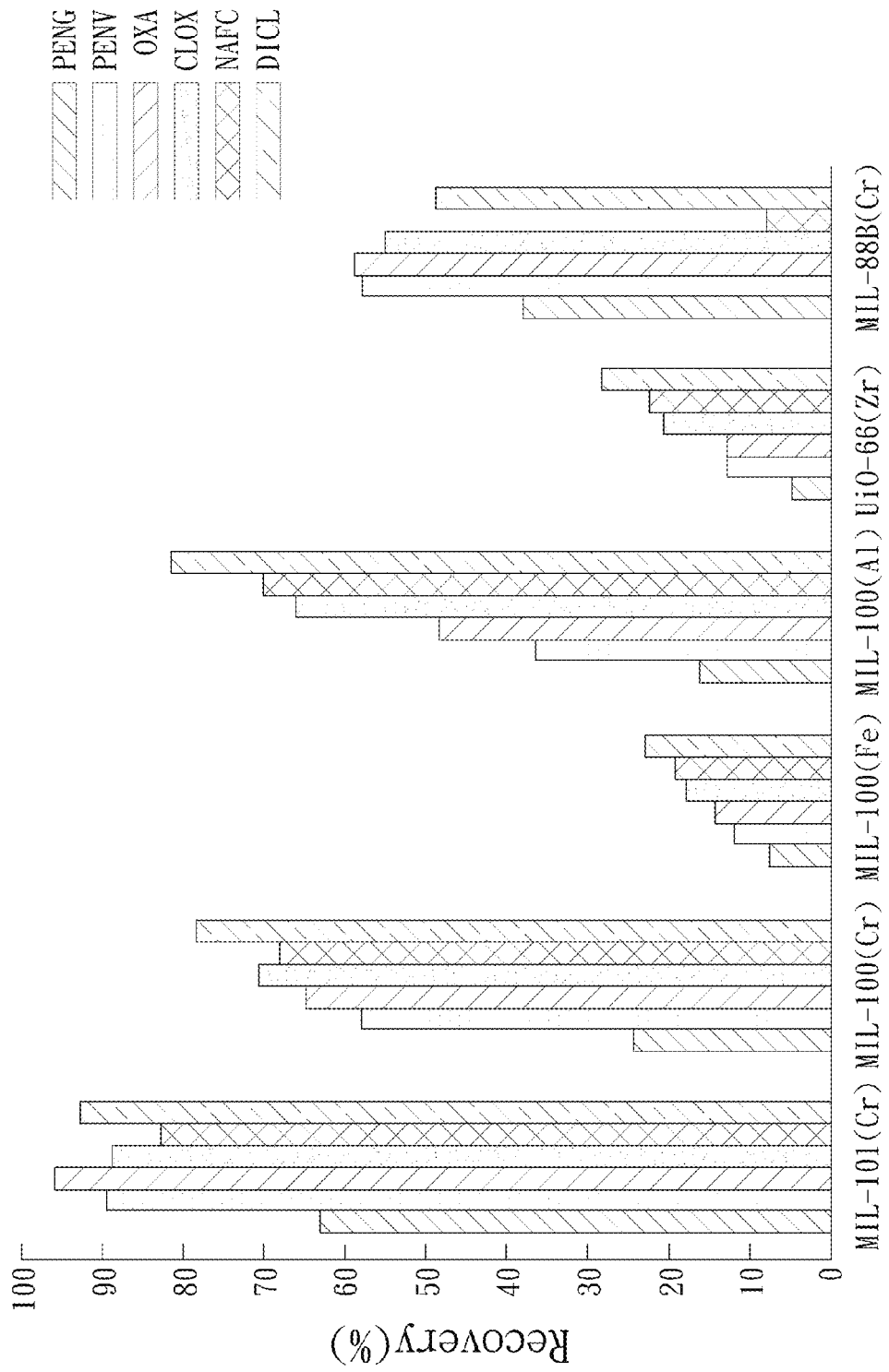
FIG. 8 is a schematic diagram showing extraction of the six penicillin samples by using different MOF-poly(BMA-EDMA) stationary phases (column length: 3 cm)

Further investigations were conducted to explore the adsorption of penicillin structures using different cage-type MOFs such as MIL-100(Cr), MIL-100(Fe), MIL-100(Al), UiO-66(Zr), and MIL-88B(Cr) while the composition of the polymer was kept to be the same (that is, the BMA-EDMA monomer ratio and the porogenic solvent type, the ionic liquid [$C_6$mim][$BF_4$], were kept constant). As mentioned earlier, increasing the sample volume and/or concentration also increases the adsorption in the MOF-polymer. However, in this case, the concentration and pH of the test analytes were the same as the previous experiments (1 $\mu gmL^{-1}$ at pH 3) to easily determine the effect of recovery period when using different MOFs-polymer systems. In addition, FIG. 8 is a schematic diagram showing extraction of the six penicillin samples by using different MOF-poly(BMA-EDMA) stationary phases (column length: 3 cm). As shown in FIG. 8, the MIL101(Cr)-polymer was the most effective stationary phase for SPME with 63-92.6% recovery at 1 $\mu gmL^{-1}$. The high adsorption of the penicillin samples is due to the high surface area of the MIL-101(Cr)-polymer as shown in the following Table 2.

TABLE 2

Brunauer-Emmett-Teller (BET) surface area of MOF-polymers used as stationary phase in SPME

| MOF-polymer | Surface area (m$^2$/g)$^a$ |
|---|---|
| MIL-101(Cr)-polymer | 167.9 |
| MIL-100(Cr)-polymer | 15.2 |
| MIL-100(Fe)-polymer | 10.4 |
| MIL-100(Al)-polymer | 18.5 |
| UiO-66(Zr)-polymer | 16.4 |
| MIL-88B(Cr)-polymer | 16.9 |

However, a low yield of PENG was consistently observed after extraction using MeOH in contrast to the other penicillin samples. Previous studies show that PENG is not stable at low pH values, has low intermolecular metal-π interaction, and low π-π interaction between the PENG and pore walls in the MOF structure, any or all of which could be responsible for this. In contrast, PENV, OXA, CLOX, NAFC, and DICL all contain more π-bonds than PENG. Thus, the good performance of MIL-101(Cr) is likely due to its unique porous structure, intermolecular chromium-π interactions, where an electron-rich analyte acts as a Lewis base to the Lewis acid sites in MIL-101(Cr), and π-π interactions, all of which are important factors for good recovery.

Additionally, MIL-100(Fe)-polymer and UiO-66(Zr)-polymer showed poor efficiency in the adsorption of penicillin structures, an observation that is due to low surface area (Table 2).

Also, as the solution pH increases, the negative charge on the surface of MIL-100(Fe) also increases, a fact that led to low adsorption capacity for penicillin structures because of electrostatic repulsion between the penicillin structures and the MIL100(Fe) surface. Despite the reported surface area of MIL100(Al)-polymer (18.5 $m^2g^{-1}$) being higher than that of MIL100(Cr)-polymer (15.2 $m^2g^{-1}$), it still offers low adsorption capacity. This is because of the polarizability of penicillin structures, which act as a base, and hence, may interact more with transition metals like $Cr_3^+$ in MIL-101, MIL-100, and MIL-88B than the hard Lewis acid center $Al^{3+}$. The MIL-101(Cr)-polymer column was compared with other literature reports based on the type of extraction procedure used with respect to the six analyte samples as given in Table 3.

TABLE 3

Comparison of extraction procedure and LOD with other literature reports

| Method | Extraction procedure | Sample | LOD | Extraction time | Reference |
|---|---|---|---|---|---|
| UPLC-MS | SPE | PENG | 0.2[a] | n.d. | [1] |
| | | PENV | n.d. | | |
| | | OXA | 0.10[a] | | |
| | | CLOX | 0.15[a] | | |
| | | NAFC | 0.03[a] | | |
| | | DICL | 2.4[a] | | |
| LC-ESI (+) TQE MS/MS | SBSE | PENG | 0.003[a] | 3 h | [2] |
| | | PENV | n.d. | | |
| | | OXA | 0.0008[a] | | |
| | | CLOX | 0.0006[a] | | |
| | | NAFC | n.d. | | |
| | | DICL | 0.0003[a] | | |
| CEC-UV | SPME | PENG | 4.3[b] | 34 min | present invention |
| | | PENV | 1.2[b] | | |
| | | OXA | 1.4[b] | | |
| | | CLOX | 2.1[b] | | |
| | | NAFC | 3.0[b] | | |
| | | DICL | 4.5[b] | | |

[a]LOD in $\mu g kg^{-1}$,
[b]LOD in $\mu g L^{-1}$,
n.d. = no data.
[1] A. Junza, R. Amatya, D. Barrón, J. Barbosa, *J. Chromatogr. B* 2011, 879, 2601-2610.
[2] X. Huang, L. Chen, M. Chen, D. Yuan, S. Nong, *J. Sep. Sci.* 2013, 36, 907-915.

The fabricated MOF-polymer was found to have an excellent extraction time (34 minutes) compared with other extraction procedures. In terms of the LOD and LOQ, the stir bar sorptive extraction (SBSE) and solid-phase extraction (SPE) have the slight advantage, that is likely due to the higher sensitivity of the mass spectrometer as well as the larger sample volumes used during preparation and extraction; however, it should be noted that the extraction time for MIL-101 (Cr)-polymer took only 34 minutes in contrast to 3 hours for SBSE.

Figure 9:
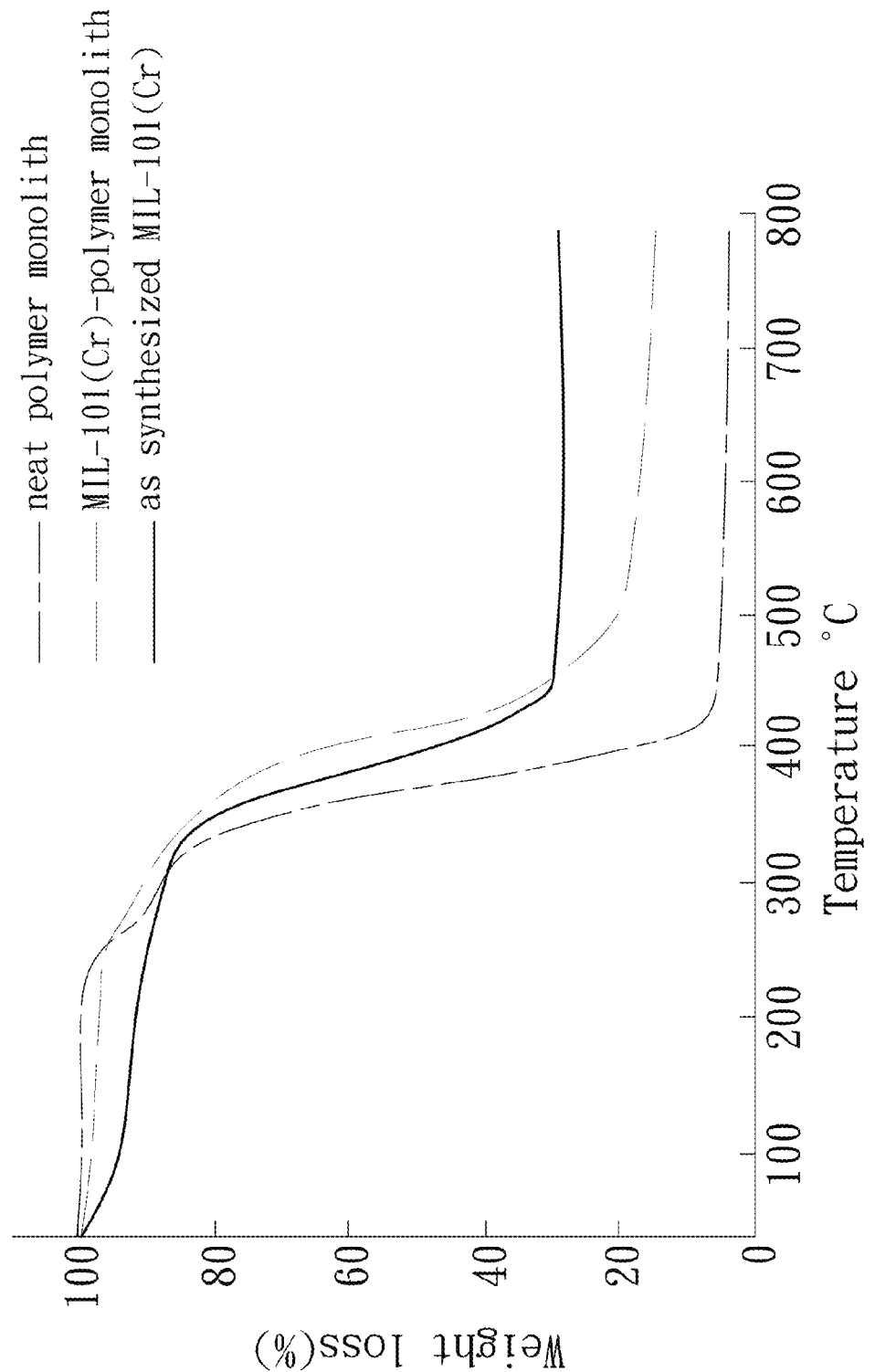
FIG. 9 is a diagram showing themorgravimetric analysis (TGA) thermograms of weight loss vs. temperature for neat polymer, MIL-101(Cr)-polymer and as-synthesized MIL-101(Cr)
Figure 10A:
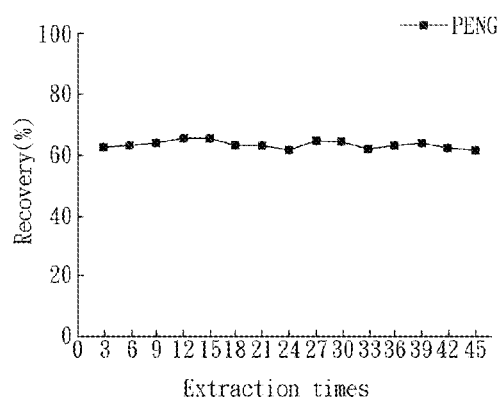
FIGS. 10A-10F are diagrams showing percent (%) recovery vs. extraction times of (a) PENG, (b) PENV, (c) OXA, (d) CLOX, (e) NAFC and (f) DICL from 1st to 45th cycle by using MIL-101(Cr)-polymer as an extraction column.
Figure 10D:
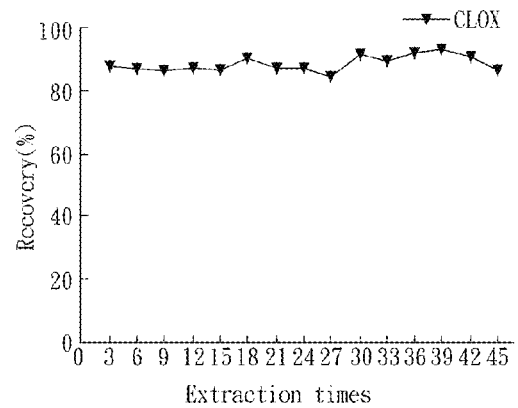
Figure 10B:
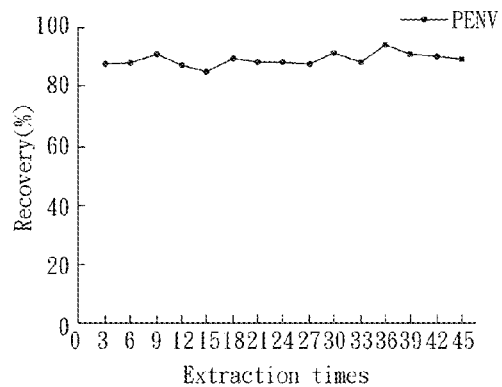
Figure 10E:
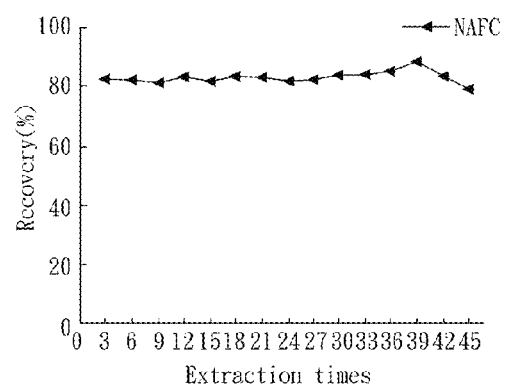
Figure 10C:
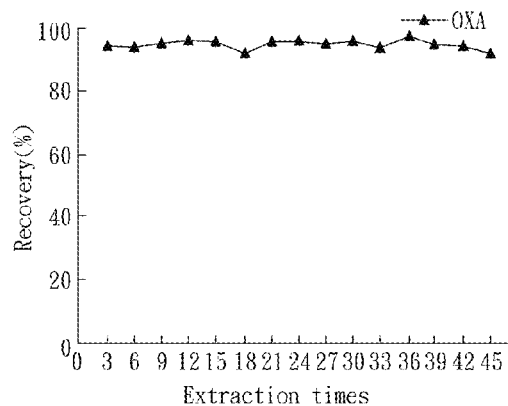
Figure 10F:
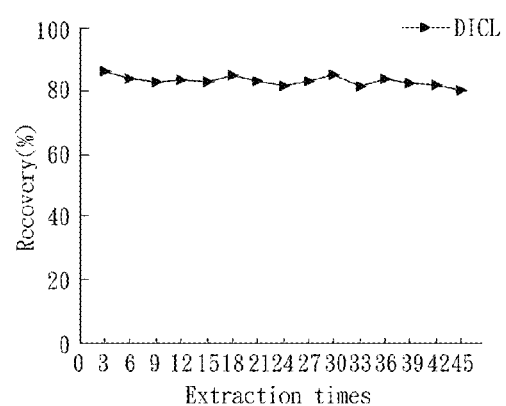

FIG. 9 is a diagram showing themorgravimetric analysis (TGA) thermograms of weight loss vs. temperature for neat polymer, MIL-101(Cr)-polymer and as-synthesized MIL-101(Cr), and FIGS. 10A-10F are diagrams showing percent (%) recovery vs. extraction times of (a) PENG, (b) PENV, (c) OXA, (d) CLOX, (e) NAFC and (f) DICL from 1st to 45th cycle. Interestingly, as shown in the following Table 4 and FIGS. 9 and 10A-10F, the MIL-101(Cr)-polymer can be reused more than 45 times without any significant changes in the performance under the same experimental conditions, an observation that was also confirmed through SEM (referring to FIGS. 1A-1D).

TABLE 4

Summary of TGA results obtained from neat polymer, MIL-101(Cr)-polymer and as-synthesized MIL-101(Cr)

| | $T_d(°C.)^a$ | | |
|---|---|---|---|
| Material | 5% | 10% | 50% |
| Neat polymer monolith | 257 | 278 | 370 |
| MIL-101(Cr)-polymer[b] | 259 | 303 | 415 |
| As synthesized MIL-101(Cr) | 81 | 244 | 398 |

[a]The decomposed temperature for the weight loss at 5%, 10%, 50%.
[b]The weight percent for MIL-101(Cr) in MOF-polymer is 50%.

Thus, using this MOF-polymer system for SMPE will have many advantages because of its reusability, unique pore sizes, time of extraction, and versatility at different pH values. The recyclability of the MOF-polymer system is a particular advantage when compared with typical SPE, which is practically used as the industry standard despite the common drawback that after extraction the performance of the stationary phase for adsorbing the analyte materials decreases and its reuse in another extraction is sometimes deemed impossible. Moreover, silicon may dissolve under basic conditions and loses it functionality under acidic conditions. Lastly, using the MOF-polymer system as an alternative stationary phase for SPME will greatly contribute to the miniaturization of sample preparation, and the subsequent reduction of volatile organic compounds (VOCs) required and the extraction time.

Finally, the proposed MOF-polymer for SPME was used in a real-life sample of river water spiked with penicillin samples at different concentrations. The recoveries of the spiked analytes ranged from 67.9-91.2% and 62.5-90.8% at concentrations of 0.05 $\mu g m L^{-1}$ and 0.10 $\mu g m L^{-1}$, respectively (Table 5). The recoveries of these spiked samples were consistent with those of the standard sample used. The results demonstrate that the MOF-polymer of the invention can be used as a stationary phase for SPME applications with high reproducibility, short extraction times, and is reusable.

TABLE 5

Application of the fabricated MIL-101(Cr)-polymer in real sample using water from river spiked with penicillins at different concentrations

| Analysts | Sample A[a] | Sample B[b] |
|---|---|---|
| penicillin G | 67.9% (4.6%) | 62.5% (4.6%) |
| penicillin V | 81.7% (4.4%) | 85.5% (3.0%) |
| oxacillin | 85.6% (3.8%) | 86.6% (2.6%) |
| cloxacillin | 91.2% (5.9%) | 90.5% (1.8%) |
| nafcillin | 89.7% (7.6%) | 87.7% (5.9%) |
| dicloxacillin | 86.0% (4.3%) | 90.8% (2.2%) |

[a]= spiked with 0.05 μg/mL penicillins
[b]= spiked with 0.10 μg/mL penicillins

To summarize, the invention provides a rapid and stable hybrid MOF-polymer monolith as a stationary phase for SPME in the extraction of six penicillin structures. The invention has demonstrated for the first time that the MOF-polymer (MIL101(Cr)-poly(EMDA-BMA)) can serve as a promising adsorbent for SPME applications with the following advantages: ease of preparation, low volume (solvent and analyte) consumption, fritless set-up, short extraction times, high reproducibility, low detection limits, good recovery percentages, low cost, and high reusability. These findings could provide a breakthrough in the use of MOFs for SPME applications.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a stationary phase for solid-phase microextraction (SPME), comprising:
providing capillary vinylization to an inner wall of a capillary tube; and
preparing an metal-organic framework (MOF)-polymer by loading and mixing an organic monomer, a cross-linker, an initiator and a progenic solvent in the capillary tube, and then performing an polymerization reaction via heating of the capillary tube,
wherein the MOF-polymer comprises:
an MOF including a plurality of metal ions building units coordinating a plurality of polytopic organic linkers; and
a polymer coordinatively bonding to the MOF, the polymer being composed of one or more vinyl monomers and a cross-linker, wherein the one or more vinyl monomers and the cross-linker are polymerized in the presence of a radical initiator,
wherein the MOF-polymer is used as a stationary phase for SPME.

2. The method for preparing a stationary phase for SPME according to claim 1, wherein the metal ions include copper (II), zinc(II), chromium(II), ion(III) iron(III), aluminium(III), zirconium(III), gallium(III) or cobalt (III).

3. The method for preparing a stationary phase for SPME according to claim 1, wherein the metal ions building units include MIL-101(Cr), MIL-100(Cr), MIL-100(Fe), MIL-100 (Al), UiO-66(Zr), or MIL-88B(Cr).

4. The method for preparing a stationary phase for SPME according to claim 1, wherein the polytopic organic linkers include 1,4-benzenedicarboxylic acid ($H_2$-bdc), 1,3,5-benzenetricarboxylic acid (1,3,5-btc), 2-amino terephthalic acid ($NH_2$-bdc), 4,4'-biphenyldicarboxylate (bpdc), 2,6-naphthalenedicarboxylate (ndc), 4,4'-stilbenedicarboxylic acid ($H_2$-SDC) or 2-methylimidazole (2-MIM), or any combinations thereof.

5. The method for preparing a stationary phase for SPME according to claim 1, wherein the vinyl monomers include divinylbenzene, divinylnaphthalene, divinylpyridine, alkylene dimethacrylates, hydroxyalkylene dimethacrylates, hydroxyalkylene diacrylates, oligo ethylene glycol dimethacrylates, oligo ethylene glycol diacrylates, vinyl esters of polycarboxylic acids, divinyl ether, pentaerythritol di-, tri-, or tetramethacrylate or acrylate, trimethylopropane trimethacrylate or acrylate, alkylene bisacrylamides or methacrylamides, or any combinations thereof.

6. A method for preparing a stationary phase for SPME, comprising the steps of:
providing capillary vinylization to an inner wall of a capillary tube; and
preparing an MOF-polymer by loading and mixing an organic monomer, a cross-linker, an initiator and a progenic solvent in the capillary tube, and then performing an polymerization reaction via heating of the capillary tube.

7. The method according to claim 6, further including a step of washing the capillary tube by methanol after the step of preparing the MOF-polymer.

8. The method according to claim 6, wherein the step of capillary vinylization is by filling the capillary tube by 3-trimethoxysilylpropyl methacrylate (MSMA) and MeOH (50%, v/v).

9. The method according to claim 6, wherein the organic monomer is selected from the group consisting of butyl methacrylate (BMA), divinylbenzene (DVB), styrene (St) and ethylene dimethacrylate (EDMA).

10. The method according to claim 6, wherein the progenic solvent is an ionic liquid selected from the group consisting of 1-hexyl-3-methylimidazolium tetrafluoroborate ([$C_6$ min][$BF_4$]), 1-ethyl-3-methylimidazolium bis(trifluoromethylsulfonyl)imide ([Emim][TF]), 1-butyl-3-methylimidazolium bis(trifluoromethylsulfonyl)imide ([Bmim][TF]), 1-butyl-3-methylimidazolium tetrafluoroborate ([Bmim][$BF_4$]), 1-butyl-3-methylimidazolium hexafluorophosphate ([Bmim][$PF_6$]) and 1-hexyl-3-methylimidazolium hexafluorophosphate ([Hmim][$PF_6$]) and any combinations thereof.

11. The method according to claim 6, wherein the heating is a microwave-assisted heating applied at a power level of about 800-1000 W for 5 minutes.

12. The method for preparing a stationary phase for SPME according to claim 1, wherein extraction recovery by using the MOF-polymer as an adsorbent for SPME of penicillins was obtained that the RSD % for intra-day, inter-day, and column-to-column were below 4.8%, 5.5% and 6.2%, respectively.

* * * * *